US008086712B2

(12) United States Patent
Sato

(10) Patent No.: US 8,086,712 B2
(45) Date of Patent: Dec. 27, 2011

(54) NAME CHANGING METHOD, INFORMATION PROCESSING APPARATUS AND NETWORK SYSTEM

(75) Inventor: Masahiko Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 422 days.

(21) Appl. No.: 12/210,936

(22) Filed: Sep. 15, 2008

(65) Prior Publication Data

US 2009/0078753 A1 Mar. 26, 2009

(30) Foreign Application Priority Data

Sep. 20, 2007 (JP) ................................ P2007-243453

(51) Int. Cl.
*G06F 15/16* (2006.01)
(52) U.S. Cl. ........................................ 709/223; 709/225
(58) Field of Classification Search ................... 709/223
See application file for complete search history.

(56) References Cited

U.S. PATENT DOCUMENTS

| 7,200,651 B1 * | 4/2007 | Niemi ............................ 709/223 |
| 2003/0037033 A1 * | 2/2003 | Nyman et al. .................... 707/1 |

FOREIGN PATENT DOCUMENTS

| EP | 1 734 706 | 12/2006 |
| JP | 8-156371 | 6/1996 |
| JP | 11-282782 | 10/1999 |
| JP | 2002-359623 | 12/2002 |
| JP | 2003-283497 | 10/2003 |
| JP | 2003-304249 | 10/2003 |
| JP | 2004-120241 | 4/2004 |
| JP | 2005-27280 | 1/2005 |

OTHER PUBLICATIONS

European Search Report from European Patent Office dated Jan. 26, 2009, for Application No. 08164626.-2413, 7 pages.
Basic: 1.0 Device Definition Version 1.0, For UPnPTM Version 1.0, Dec. 12, 2002.

* cited by examiner

*Primary Examiner* — Wing F. Chan
*Assistant Examiner* — Andrew Woo
(74) *Attorney, Agent, or Firm* — Finnegan, Henderson, Farabow, Garrett & Dunner, L.L.P.

(57) ABSTRACT

The present invention is a method for changing a device identification name of an information processing apparatus to which the device identification name is added for identification by a user. First, a device identification name of other information processing apparatus connected to a same network is obtained. Next, the device identification name of the other information processing apparatus and the device identification name of the information processing apparatus are compared. Further, when the device identification name of the other information processing apparatus and the device identification name of the information processing apparatus are the same, it is judged, according to a predetermined rule set beforehand, whether or not to change the device identification name of the information processing apparatus. Then, when it is judged to change the device identification name of the information processing apparatus, the device identification name of the information processing apparatus is changed.

5 Claims, 10 Drawing Sheets

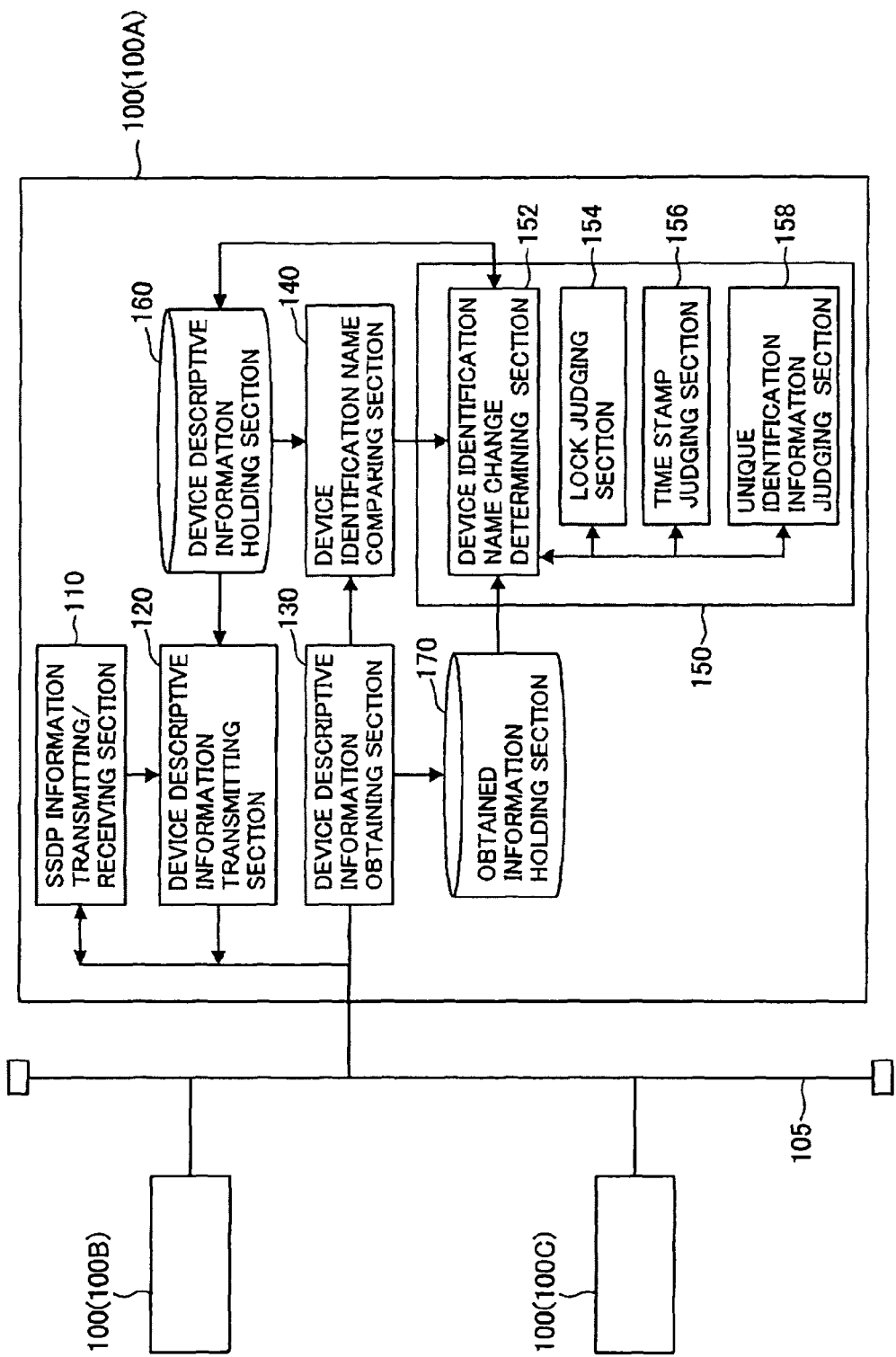

FIG.2

```
<?xml version="1.0"?>
<root xmlns="urn:schemas-upnp-org:device-1-0"?>
<specVersion>
<major>1</major>
<minor>0</minor>
</specVersion>
<URLBase>base URL for all relative URLs</URLBase>
<device>
<deviceType>urn:schemas-upnp-org:device:Basic:1<deviceType>
<friendlyName>short user-friendly title</friendlyName>   ~161
<friendlyNameLock>yes</friendlyNameLock>   ~162
<friendlyNameAccess>2007.03.23.16:00:30</friendlyNameAccess>~163
```
165

NAME CHANGING METHOD, INFORMATION PROCESSING APPARATUS AND NETWORK SYSTEM

CROSS REFERENCES TO RELATED APPLICATIONS

The present invention contains subject matter related to Japanese Patent Application JP 2007-243453 filed in the Japan Patent Office on Sep. 20, 2007, the entire contents of which being incorporated herein by reference.

BACKGROUND OF THE INVENTION

1. Field of the Invention

The present invention relates to a name changing method, an information processing apparatus and a network system for changing a device identification name of an information processing apparatus to which the device identification name is added for identification by a user.

2. Description of the Related Art

Recently, digitalization of information is being rapidly developed, and information devices for handling digital information have become rapidly widespread in homes. For example, music players for playing back music data recorded in compact disks, DVD (Digital Versatile Disc) players for playing back movies recorded in DVDs, and the like, are widespread around the world. Further, photographs taken by digital cameras and TV programs digitally recorded are stored in a personal computer and the like and managed in homes. However, accumulated images, videos, music information or the like are not particularly effectively utilized other than being personally viewed and enjoyed. The reason being, for example, when a family wants to view video images captured by a digital video camera, they may have to go through complicated procedures of connecting devices to display the video images stored and managed in a hard disk of a personal computer on a large TV in the living room.

In view of the above, there has been a movement to lay down a standard for information technology for realizing sharing of digital information using wireless or wired communication in homes (so-called home network). For example, companies and the like manufacturing and selling home electronics, cellular phones, personal computers and the like have established a nonprofit organization called DLNA (Digital Living Network Alliance). A home network envisioned by the DLNA is configured by including a server device in which contents such as video and music are stored (DMS; Digital Media Server) and a player device for playing back these contents (DMP; Digital Media Player), and the contents are distributed from the DMS to the DMP based on predetermined transmission system and format, and are played back.

As such, connection environment between devices installed in a home network is being improved. However, with the increase in the number of devices installed in a home network, it is becoming burdensome for users to select a desired content or select a device suitable for playing back of the content. At present, it is needed to either operate directly on a DMP or, by using the DMS and the like described above, select a desired content among the contents accumulated in the DMS and specify a DMP for playing back the content.

Here, an identification name unique to a device, such as a serial number or a device ID, used by a device to identify other devices and a device identification name for users called a friendlyName used by users to identify devices connected in a home network are added to the DMS and the DMP. friendlyNames are displayed on a GUI (Graphical User Interface), for example, and users can select a desired device from the friendlyNames being displayed.

Although it is not allowed to set the same name as an identification name unique to respective devices, it is possible to set the same name as device identification names for users. The device identification name for users is normally set at the time of factory shipment, and generally, the same name is set for devices of a model.

SUMMARY OF THE INVENTION

However, when a plurality of devices having the same device identification name for users exist in the same network, the same device identification names are displayed on a GUI, and users have difficulty distinguishing between these devices. In such a case, users have to change the device identification names manually.

Further, in a case where the device identification names for users are changed automatically, there is a possibility that the names are changed randomly and the device identification name of a device already recognized by a user is also changed, and thus, there is a problem that the user cannot re-recognize a device he once recognized.

In light of the foregoing, it is desirable to provide a new and improved name changing method, an information processing apparatus and a network system which enable to automatically change device identification names when a plurality of information processing apparatuses having the same device identification name for users exist in the name network.

According to an embodiment of the present invention, there is provided a name changing method for changing a device identification name of an information processing apparatus to which the device identification name is added for identification by a user. According to the name changing method of the embodiment of the present invention, an obtaining step obtaining a device identification name of other information processing apparatus connected to a same network, a comparing step comparing the device identification name of the other information processing apparatus and the device identification name of the information processing apparatus, a judging step judging, according to a predetermined rule set beforehand, whether or not to change the device identification name of the information processing apparatus when the device identification name of the other information processing apparatus and the device identification name of the information processing apparatus are the same, and a changing step changing the device identification name of the information processing apparatus when it is judged to change the device identification name of the information processing apparatus in the judging step are included.

According to the embodiment of the present invention, the information processing apparatus obtains a device identification name of other information processing apparatus connected via a network and compares the obtained device identification name and the device identification name of the information processing apparatus. If, as a result of the comparing, the device identification names are found to be the same, it is judged, according to a predetermined rule, whether or not to change the device identification name of the information processing apparatus. The information processing apparatus changes the self device identification name only when it is judged that the change is necessary.

Here, the judging step can include a lock judging step judging, based on lock information indicating whether it is possible to change the device identification name of the information processing apparatus, whether or not to change the device identification name of the information processing apparatus. The lock information is stated based on whether or not the information processing apparatus is recognized by a device connected to the same network, for example. As such, in a case where, for example, confusion may be caused on the recognition between the devices due to the changing of the device identification name, the lock information can be set to prevent the change of the device identification name.

Further, the judging step can include a time stamp judging step judging whether or not to change the device identification name of the information processing apparatus based on access history indicating status of access from an information processing apparatus connected to the same network. At this time, the time stamp judging step may compare the time stamp of the information processing apparatus and time stamp of the other information processing apparatus and change the device identification name of the information processing apparatus when the time stamp of the information processing apparatus is older than that of the other information processing apparatus.

Further, the judging step can include a unique identification information judging step that compares identification information unique to the information processing apparatus and identification information unique to the other information processing apparatus and judges whether or not to change the device identification name of the information processing apparatus. By using identification information unique to an information processing apparatus that aspecifies the information processing apparatus, it can be judged with accuracy whether or not to change the device identification name.

According to another embodiment of the present invention, there is provided an information processing apparatus to which a device identification name is added for identification by a user. According to the embodiment of the present invention, an obtaining section obtaining a device identification name of other information processing apparatus connected to the same network, a comparing section comparing the device identification name of the other information processing apparatus and the device identification name of the information processing apparatus, a judging section judging, according to a predetermined rule set beforehand, whether or not to change the device identification name of the information processing apparatus when the device identification name of the other information processing apparatus and the device identification name of the information processing apparatus are the same, and a changing section changing the device identification name of the information processing apparatus when it is judged to change the device identification name of the information processing apparatus are included.

According to another embodiment of the present invention, there is provided a network system in which a plurality of information processing apparatuses to which device identification names are added for identification by a user are connected with each other via the network. In such network, a first information processing apparatus obtains a device identification name of a second information processing apparatus connected to the same network. Next, the first information processing apparatus compares the device identification name of the second information processing apparatus and the device identification name of the first information processing apparatus, and judges, according to a predetermined rule set beforehand, whether or not to change the device identification name of the first information processing apparatus when the device identification name of the second information processing apparatus and the device identification name of the first information processing apparatus are the same. When it is judged to change the device identification name of the first information processing apparatus, the device identification name of the first information processing apparatus is changed.

According to the embodiments of the present invention, a name changing method, an information processing apparatus and a network system are provided that enable to automatically change a device identification name when a plurality of information processing apparatuses having the same device identification name for users exist in the same network.

BRIEF DESCRIPTION OF THE DRAWINGS

FIG. 1 is a block diagram showing a configuration of an information processing apparatus according to a first embodiment of the present invention.

FIG. 2 is an explanatory diagram showing a memory content of a device descriptive information holding section according to the embodiment.

DETAILED DESCRIPTION OF THE PREFERRED EMBODIMENTS

Figure 3:
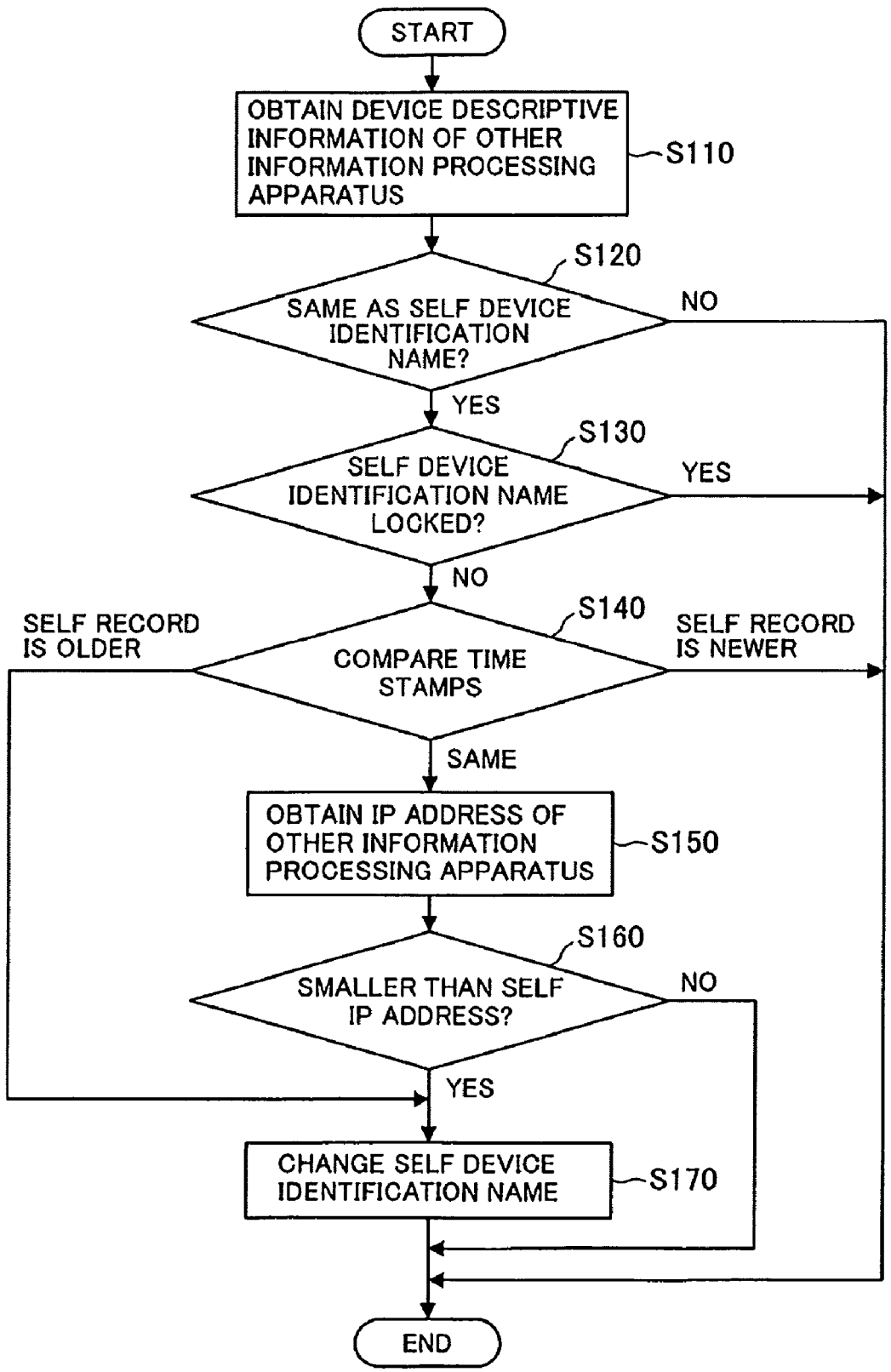
FIG. 3 is a flow chart showing a method for changing a device identification name.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

First Embodiment

First, by referring to FIGS. 1 and 2, a configuration of an information processing apparatus according to a first embodiment of the present invention will be described. Incidentally, FIG. 1 is a block diagram showing the configuration of the information processing apparatus 100 according to the embodiment. FIG. 2 is an explanatory diagram showing a memory content of a device descriptive information holding section 160 according to the embodiment. Incidentally, the information processing apparatuses 100A, 100B and 100C are of the same type, and the information processing apparatuses 100B and 100C have the same configuration as the information processing apparatus 100A.

(Configuration of Information Processing Apparatus)

As shown in FIG. 1, the plurality of the information processing apparatuses 100A, 100B and 100C are connected to the same network 105. The information processing apparatus 100 according to the embodiment is a network device capable of being connected to a network, for example, a video recorder and the like. As shown in FIG. 1, the information processing apparatus 100 is configured with an SSDP information transmitting/receiving section 110, a device descriptive information transmitting section 120, a device descriptive information obtaining section 130, a device identification name comparing section 140, a name changing section 150, a device descriptive information holding section 160 and an obtained information holding section 170.

The SSDP information transmitting/receiving section 110 is a function section transmitting and receiving information that is communicated based on an SSDP (Simple Service Discovery Protocol) which automatically detects an entry of a device into a network in an ad hoc UPnP network. For example, when the information processing apparatus 100A is connected to the network 105, the SSDP information transmitting/receiving section 110 of the information processing apparatus 100A connected transmits a Notify signal notifying of its connection to the network 105 to the other information processing apparatuses 100B and 100C already connected to the network 105. On the other hand, when the other information processing apparatuses 100B and 100C are newly connected to the network 105, the SSDP information transmitting/receiving section 110 receives Notify signals transmitted from the other information processing apparatuses 100B and 100C.

The device descriptive information transmitting section 120 is a function section transmitting to the other information processing apparatuses 100 (100B, 100C) device descriptive information describing function and information the information processing apparatus 100 (100A) is capable of providing. The device descriptive information according to the embodiment is an XML device description defined in the specification of the DLNA as indicated in "Basic: 1.0 Device Definition Version 1.0, For UPnP™ Version 1.0, Dec. 12, 2002" (hereinafter referred to as Non-Patent Document 1). The device descriptive information transmitted from the device descriptive information transmitting section 120 is obtained from the device descriptive information holding section 160.

The device descriptive information obtaining section 130 is a function section obtaining device descriptive information of the other information processing apparatuses 100 (100B, 100C). The device descriptive information obtaining section 130 outputs the device descriptive information obtained to the device identification name comparing section 140 and, stores the same in the obtained information holding section 170 described later.

The device identification name comparing section 140 is a function section comparing a self device identification name of information processing apparatus 100 (100A) and device identification names of the other information processing apparatuses 100 (100B, 100C) and judging whether these names are the same or not. The device identification name according to the embodiment is the friendlyName defined in the specification of the DLNA as indicated in Non-Patent Document 1. The device identification name comparing section 140 obtains the self device identification name from the device descriptive information holding section 160 described later. Then, the device identification name comparing section 140 obtains the device identification names of the other information processing apparatuses 100B and 100C from the device descriptive information obtained by the device descriptive information obtaining section 130 and compares them with the self device identification name. When it is judged that the device identification names are the same, the device identification name comparing section 140 instructs the name changing section 150 to judge whether the device identification names are to be changed or not.

The name changing section 150 is a function section judging whether the device identification name is to be changed or not, and includes a device identification name change determining section 152, a lock judging section 154, a time stamp judging section 156 and a unique identification information judging section 158.

The device identification name change determining section 152 is a function section determining whether the device identification name is to be changed or not based on judgment results of the lock judging section 154, the time stamp judging section 156 and the unique identification information judging section 158. Upon receiving an instruction from the device identification name comparing section 140, the device identification name change determining section 152 instructs the lock judging section 154, the time stamp judging section 156 or the unique identification information judging section 158 to start a determination processing. Further, upon receiving the judgment result of the lock judging section 154, the time stamp judging section 156 or the unique identification information judging section 158, the device identification name change determining section 152 determines whether or not to change the device identification name. Further, when it is determined to change the device identification name, the device identification name change determining section 152 updates the device identification name stored in the device descriptive information holding section 160 to a new device identification name.

The lock judging section 154 is a function section judging whether it is possible to change the self device identification name based on lock information indicating whether it is possible to change the device identification name. The lock information is recognition performance information indicating whether or not the information processing apparatus 100 (100A) is recognized by a device connected to the network, for example the other information processing apparatuses 100 (100B, 100C). In case it has been recognized, "yes" is stated, and in case it has not been recognized, "no" is stated. If the device identification name is changed when the information processing apparatus 100A is being recognized by the other device (for example, at least one of the information processing apparatuses 100B and 100C), it becomes hard for the devices which have already recognized the device identification name to re-recognize the information processing apparatus 100A. Thus, when the lock information is "yes", the lock judging section 154 judges that the device identification information for users cannot be changed. On the other hand, when the lock information is "no", the lock judging section 154 judges that the device identification information for users can be changed. Then, the lock judging section 154 transmits the judgment result to the device identification name change determining section 152.

The time stamp judging section 156 is a function section judging whether or not to change the device identification name of the information processing apparatus 100 (100A) based on history of access from a device connected to the same network 105, for example, the information processing apparatuses 100 (100B, 100C). Upon receiving an instruction from the device identification name change determining section 152, the time stamp judging section 156 compares the self time stamp and the time stamps of the other information processing apparatuses 100B and 100C. Then, the time stamp judging section 156 transmits the judgment result to the device identification name change determining section 152.

The unique identification information judging section 158 is a function section judging whether or not to change the self device identification name based on identification information unique to each information processing apparatus. The unique identification information is identification information unique to a device, such as an IP address, a serial number and a device ID. The unique identification information judging section 158 compares the unique identification information of itself (information processing apparatus 100 (100A)) and the unique identification information of the other information processing apparatuses 100 (100B, 100C). Then, the unique identification information judging section 158 transmits the judgment result to the device identification name change determining section 152.

The device descriptive information holding section 160 is a storage section storing device descriptive information describing function and information the information processing apparatus 100 (100A) is capable of providing, and is configured by including a memory such as a RAM and a hard disk. An XML device description 165 as shown in FIG. 2 is stored in the device descriptive information holding section 160, and a friendlyName 161 specified by <friendlyName>, lock information 162 specified by <friendlyNameLock> and a time stamp 163 specified by <friendlyNameAccess> and the like are stored therein.

The obtained information holding section 170 is a storage section storing the device descriptive information obtained by the information processing apparatus 100 (100A) from the other information processing apparatuses 100 (100B, 100C), and is configured by including a memory such as a RAM and a hard disk. Similarly to the device descriptive information holding section 160, device descriptive information as shown in FIG. 2 is stored in the obtained information holding section 170.

Heretofore, the configuration of the information processing apparatus 100 according to the embodiment has been described. Next, by referring to FIG. 3, a method for changing a device identification name according to the embodiment will be described. Here, FIG. 3 is a flow chart showing the method for changing a device identification name. When an information processing apparatus 100 is newly connected to the network 105, device description information is transmitted and received between the information processing apparatus 100 already connected to the network 105 and the information processing apparatus 100 newly connected. Then, each information processing apparatus 100 judges whether or not to change the self device identification name by the method for changing the device identification name according to the embodiment, and changes the device identification name based on the judgment result.

(Method for Changing Device Identification Name)

As shown in FIG. 3, according to the method for changing a device identification name according to the embodiment, first, the information processing apparatus 100 (100A) obtains the device descriptive information of the other information processing apparatuses 100 (100B, 100C) (S110). The device descriptive information of the other information processing apparatuses 100B and 100C are transmitted from the other information processing apparatuses 100B and 100C that received a Notify signal transmitted from the information processing apparatus 100A.

Next, the information processing apparatus 100 judges whether the device identification name of the information processing apparatus 100 (100A) and the device identification names of the other information processing apparatuses 100 (100B, 100C) are the same or not (S120). The device identification name is stated in the device descriptive information of the each information processing apparatus 100. The device identification name comparing section 140 obtains the self device identification name of information processing apparatus 100A from the self device descriptive information stored in the device descriptive information holding section 160. On the other hand, the device identification name comparing section 140 obtains the device identification names of the other information processing apparatuses 100B and 100C from the device descriptive information transmitted from the other information processing apparatuses 100B and 100C. Then, the device identification comparing section 140 judges whether the device identification name of the information processing apparatus 100A and those of the information processing apparatuses 100B and 100C are the same with each other or not.

When it is judged that the device identification names are different from each other, the information processing apparatus 100 terminates the processing without changing the self device identification name. On the other hand, when it is judged that the device identification names are the same, the processing proceeds to step S130.

When it is judged in step S120 that the device identification names are the same, the information processing apparatus 100 checks whether it is possible to change the self device identification name (S130). The lock judging section 154 of the name changing section 150 can judge whether it is possible to change the device identification name by the lock information stated in the self device descriptive information. When the lock information is "yes", the processing is terminated without the information processing apparatus 100 changing the self device identification name since there is a possibility that other device has already recognized the information processing apparatus 100. On the other hand, when the lock information is "no", the processing proceeds to step S140.

When it is judged in step S130 that the self lock information is "no", the information processing apparatus 100 further compares the time stamp of information processing apparatus 100 (100A) and the time stamps of the other information processing apparatuses 100 (100B, 100C) (S140). The access history is stated in the device descriptive information and, for example, date and time a device connected to the same network 105 last accessed the information processing apparatus 100 are stated. As a result of comparing the time stamps of the information processing apparatus 100A and the other information processing apparatuses 100B and 100C, if the self time stamp is newer than those of others, the information processing apparatus 100 terminates the processing without changing the self device identification name. On the other hand, if the self time stamp is older than that of the other, the information processing apparatus 100 changes the self device identification name (S170). The processing of step S170 will be described later. If the time stamps are the same, the processing proceeds to step S150.

When the time stamps are the same in step S140, the information processing apparatus 100 (100A) obtains IP addresses of the other information processing apparatuses 100 (100B, 100C) (S150). An IP address is identification information unique to a device, and corresponds uniquely with one information processing apparatus 100. In step S150, the information processing apparatus 100 accesses again the other information processing apparatus 100 and obtains the IP address of the other information processing apparatus 100. Incidentally, although an IP address is used in the embodiment, the present invention is not limited to such, and a serial number, a device ID and the like may be used as unique identification information.

Next, the IP address of the information processing apparatus 100 (100A) and the IP addresses of the information processing apparatuses 100 (100B, 100C) are compared, and it is judged whether or not to change the self device identification name (S160). The processing of step S160 is a processing of automatically determining, in case of changing the device identification name of only one of two information processing apparatuses 100, the information processing apparatus 100 whose device identification name is to be changed. In the embodiment, a rule is set that "the device identification name of the information processing apparatus 100 whose number of IP address is smaller is not to be changed". Such rule may be changed to "the device identification name of the information processing apparatus whose number of IP address is smaller is to be changed". Similar rules may be set for unique identification information other than the IP address.

According to the rule set in the embodiment, in case the self IP address is smaller than that of the other, the information processing apparatus 100 changes the self device identification name (S170). On the other hand, when the IP address of the other is smaller than the self IP address, the information processing apparatus 100 terminates the processing without changing the self device identification name.

In the processing of step S170 of changing the self device identification name, the name is changed to that which is not the same with the device identification name of the other information processing apparatus 100. At this time, the name can be changed according to a predetermined rule. As an example of such rule, it may be possible to include changing of the device identification name by adding a predetermined character and the like at the end of the device identification name. For example, when the device identification name before change is "BDZ", the device identification name after change will be "BDZ-1". Incidentally, when there is a rule to the way of adding a character and the like to the device identification name, a storage section for storing information needed for the processing may be separately provided. For example, when adding a number to the same device identification name successively beginning from 1, by storing the number last added in the storage section, it becomes possible to easily determine the number to be added next.

Figure 4:
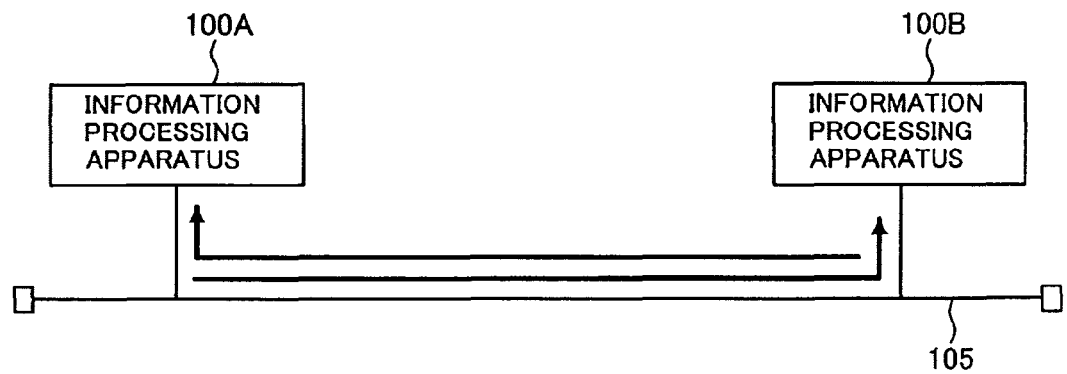
FIG. 4 is an explanatory diagram showing a state where two information processing apparatuses are connected to the same network.
Figure 5:
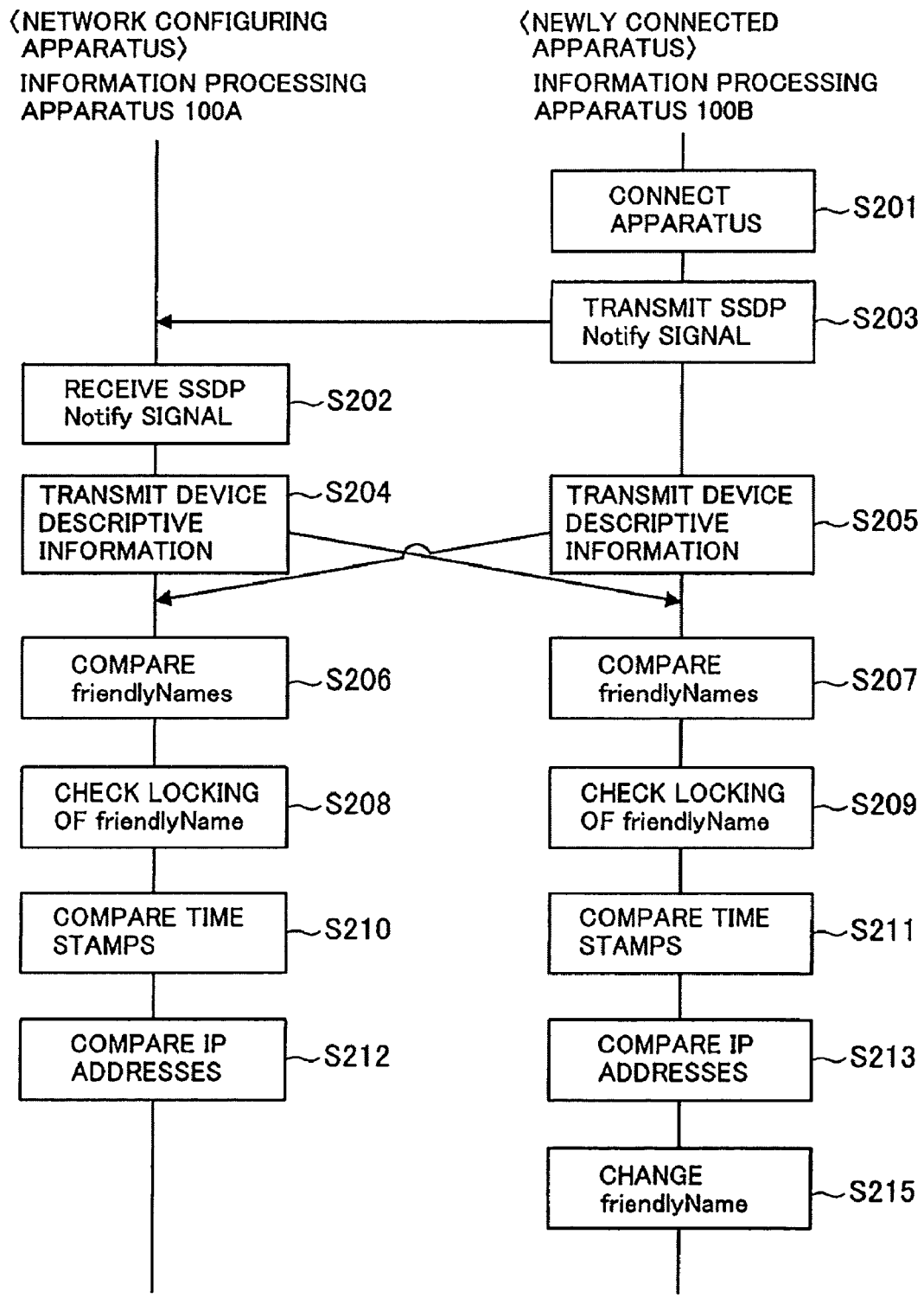
FIG. 5 is a time chart showing a processing of changing the device identification names of the two information processing apparatuses.

As such, even when there are device identification names that are the same with each other, each information processing apparatus 100 judges whether or not to change the self device identification name and can automatically change the self device identification name in accordance with the judgment. Heretofore, the method for changing a device identification name according to the embodiment has been described. Next, by referring to FIGS. 4 and 5, as an example of the processing of changing a same device identification name by using the method for changing a device identification name according to the embodiment, a case will be described where an information processing apparatus 100 is newly connected to a network 105 to which one information processing apparatus 100 is already connected. Here, FIG. 4 is an explanatory diagram showing a state where two information processing apparatuses 100A and 100B are connected to the same network 105. FIG. 5 is a time chart showing a processing of changing friendlyNames which are the device identification names of the two information processing apparatuses 100A and 100B.

<1. Processing of Changing friendlyNames of Two Information Processing Apparatuses Connected to Same Network>

First, it is presumed that an information processing apparatus 100B is connected to a network 105 to which an information processing apparatus 100A is already connected (S201). The information processing apparatus 100B newly connected to the network 105 transmits a Notify signal which is transmitted in accordance with SSDP to the information processing apparatus 100A (S203).

Next, the information processing apparatus 100A receives the Notify signal from the information processing apparatus 100B (S202). After receiving the Notify signal, the information processing apparatus 100A transmits self device descriptive information, that is, the device descriptive information of the information processing apparatus 100A, to the information processing apparatus 100B (S204). Also, after transmitting the Notify signal, the information processing apparatus 100B transmits self device descriptive information, that is, the device descriptive information of the information processing apparatus 100B, to the information processing apparatus 100A (S205).

The information processing apparatuses 100A and 100B that received the device descriptive information from each other start the processing as shown in FIG. 3, respectively. First, each information processing apparatus 100A and 100B compares the friendlyNames of each other (S206, S207, corresponding to S120 of FIG. 3). As shown in FIG. 4, the friendlyNames of the information processing apparatuses 100A and 100B are both "BDZ", and thus, are the same to each other. Accordingly, the information processing apparatuses 100A and 100B respectively perform the next processing of judging.

Next, the information processing apparatuses 100A and 100B respectively check whether it is possible to change the self friendlyNames (S208, S209, corresponding to S130 of FIG. 3). As shown in FIG. 4, lock information of the information processing apparatuses 100A and 100B are both "NO". That is, both of the self friendlyNames of the information processing apparatuses 100A and 100B can be changed. Accordingly, the information processing apparatuses 100A and 100B further proceed to the next processing of judging.

Further, the information processing apparatuses 100A and 100B respectively compare time stamps of each other (S210, S211, corresponding to S140 of FIG. 3). As shown in FIG. 4, since neither of the information processing apparatuses 100A and 100B are accessed by other apparatuses, there are no time stamps, and thus, the apparatuses have the same access history. Accordingly, the information processing apparatuses 100A and 100B further proceed to the next processing of judging.

Then, the information processing apparatuses 100A and 100B respectively obtain the IP address of each other and compare the IP addresses of both sides, and judge whether or not to change the self friendlyName (S212, S213, corresponding to S150, S160 of FIG. 3). As shown in FIG. 4, the IP address of the information processing apparatus 100A is "xxx.xxx.xxx.1" and the IP address of the information processing apparatus 100B is "xxx.xxx.xxx.2". Here, when following the rule that "the device identification name of the information processing apparatus 100 whose number of IP address is smaller is not to be changed", since the IP address of the information processing apparatus 100A is smaller, the processing is terminated without changing the friendlyName of the information processing apparatus 100A. On the other hand, the information processing apparatus 100B changes the self friendlyName and terminates the processing.

Figure 6:
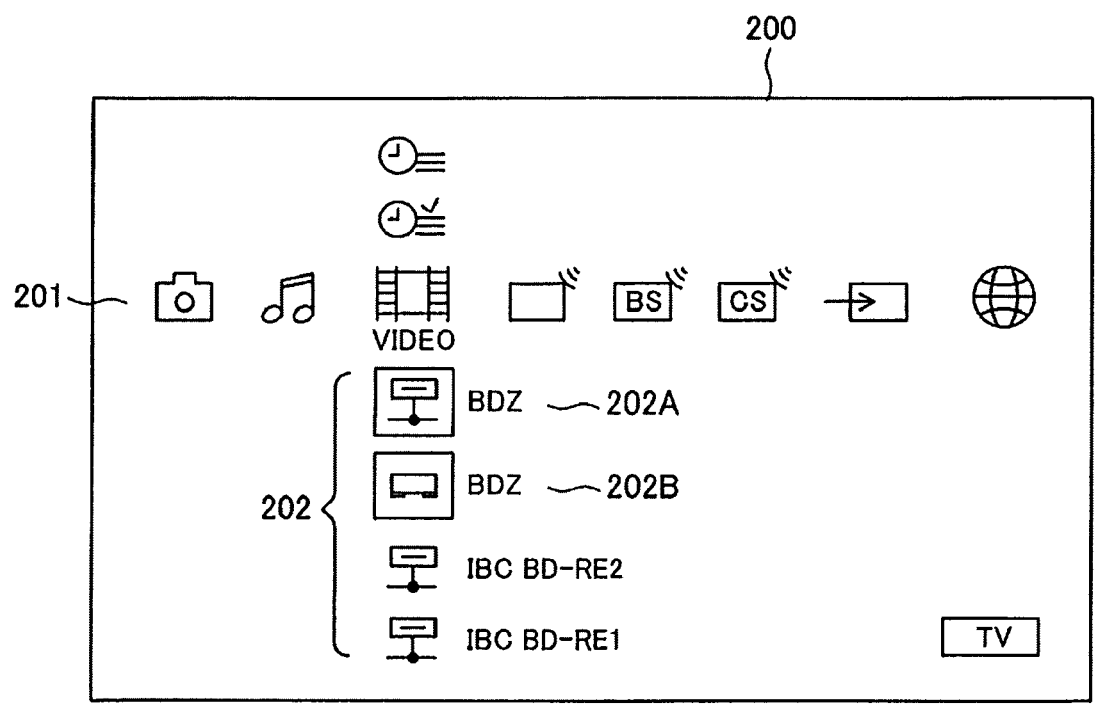
FIG. 6 shows a device selection screen where processing by the method for changing a device identification name according to the embodiment is not performed.
Figure 7:
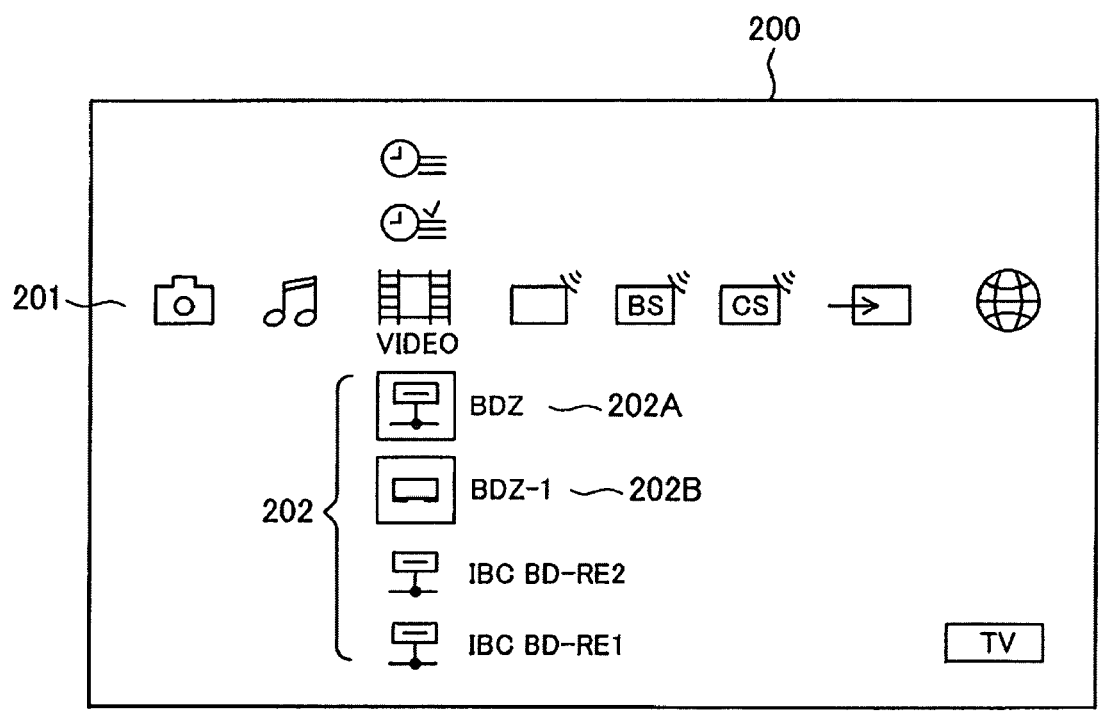
FIG. 7 shows a device selection screen where processing by the method for changing a device identification name according to the embodiment is performed.

Here, a friendlyName is a name used by a user to identify a device in the DLNA, and it is displayed on a GUI (Graphical User Interface), for example. A user can select an intended device from the friendlyNames displayed on the GUI or operate on the selected device. As an example, FIGS. 6 and 7 show a device selection screen 200 displayed on a display. Incidentally, FIG. 6 shows the device selection screen 200 where processing by the method for changing a device identification name according to the embodiment is not performed. FIG. 7 shows the device selection screen 200 where processing by the method for changing a device identification name according to the embodiment is performed.

On the device selection screen 200, content which is desired to be displayed on a display or a device for playing back the content can be selected. As shown in FIGS. 6 and 7, there are displayed on the device selection screen 200 icons for major classification 201 indicating the types of content to be played back, such as image, music and video, that can be selected and icons for minor classification 202, that are displayed below the icons for major classification 201, indicating devices and the like for playing back the selected type of content. Here, the icon for minor classification 202A and the information processing apparatus 100A, and the icon 202B and the information processing apparatus 100B correspond to each other, respectively.

When the processing by the method for changing a device identification name according to the embodiment is not performed, the friendlyNames of the information processing apparatus 100A and the information processing apparatus 100B are both "BDZ", and a user cannot distinguish the two devices on the screen. On the other hand, when the processing as shown in FIG. 5 is performed, as shown in FIG. 7, the friendlyNames of the information processing apparatus 100A and the information processing apparatus 100B are displayed differently as "BDZ" and "BDZ-1". As such, by performing the processing by the method for changing a device identification name, even when friendlyNames of a plurality of information processing apparatuses 100 are the same, each information processing apparatus 100 judges whether or not to change the self friendlyName and can automatically change the friendlyName based on the judgment result. Thereby, it becomes possible for a user to distinguish a device based on the friendlyName without specific operations.

Figure 8:
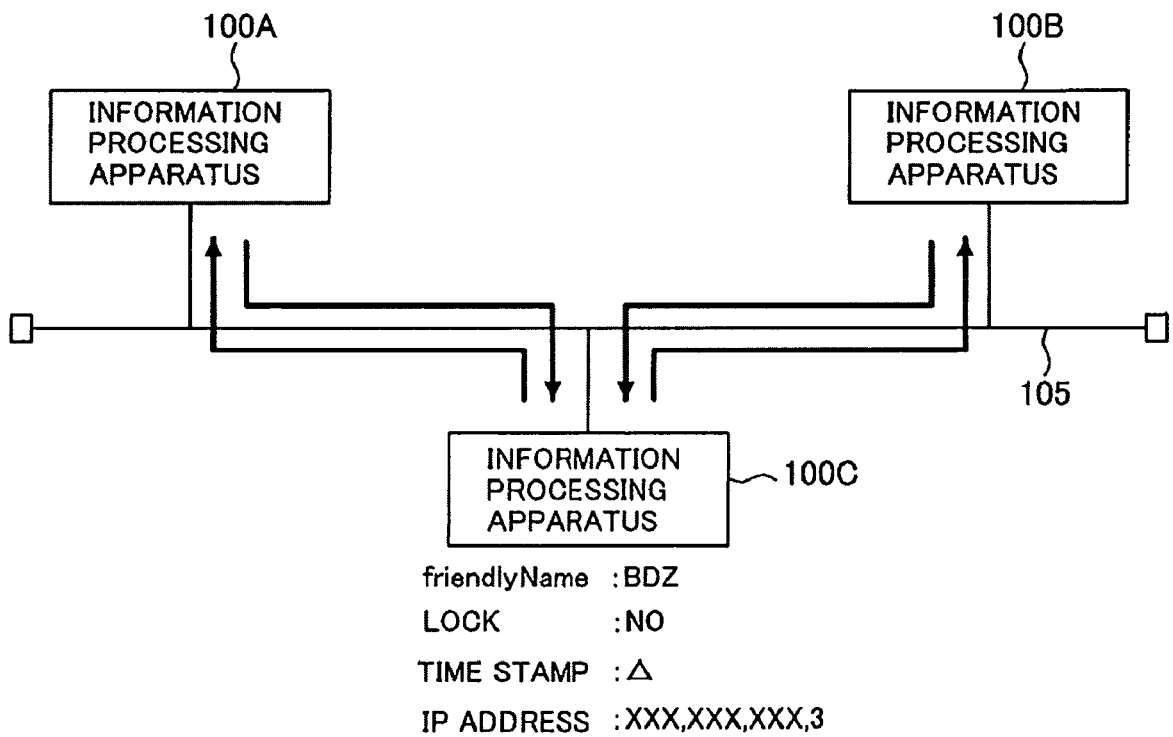
FIG. 8 is an explanatory diagram showing a state where three information processing apparatuses are connected to the same network.
Figure 9:
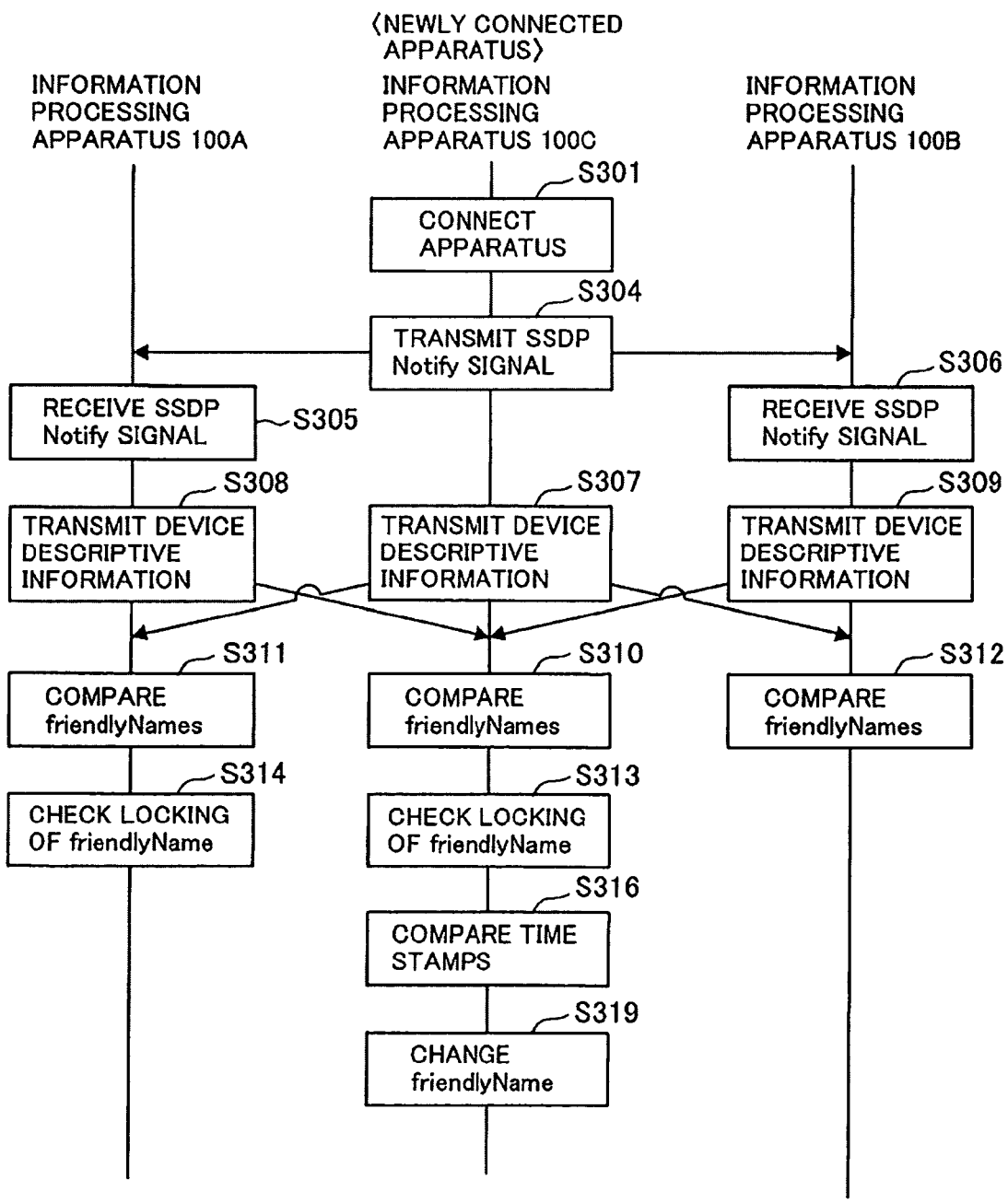
FIG. 9 is a time chart showing a processing of changing the device identification names of the three information processing apparatuses.

Next, by referring to FIGS. 8 and 9, an another example of the processing of changing the same device identification names by using the method for changing a device identification name according to the embodiment will be described where another information processing apparatus is further connected to a network 105 to which two information processing apparatuses which have gone through the processing as shown in FIG. 5 are connected. Here, FIG. 8 is an explanatory diagram showing a state where three information processing apparatuses 100A, 100B and 100C are connected to the same network 105. FIG. 9 is a time chart showing a processing of changing the friendlyNames of the three information processing apparatuses 100A, 100B and 100C.

<2. Processing of Changing friendlyNames of Three Information Processing Apparatuses Connected to the Same Network>

First, it is presumed that an information processing apparatus 100C is connected to a network 105 to which information processing apparatuses 100A and 100B are already connected (S301). The information processing apparatus 100C newly connected to the network 105 transmits a Notify signal which is transmitted in accordance with SSDP to the information processing apparatuses 100A and 100B (S304).

Next, the information processing apparatuses 100A and 100B receive the Notify signal from the information processing apparatus 100C (S305, S306). After receiving the Notify signal, the information processing apparatuses 100A and 100B respectively transmit self device descriptive information to the information processing apparatus 100C (S308, S309). Also, after transmitting the Notify signal, the information processing apparatus 100C transmits self device descriptive information, that is, the device descriptive information of the information processing apparatus 100C, to the information processing apparatuses 100A and 100B (S307).

The information processing apparatuses 100A, 100B and 100C that received the device descriptive information from each other start the processing as shown in FIG. 3, respectively. First, each information processing apparatus 100A, 100B and 100C compares the friendlyNames of each other (S310, S311, S312, corresponding to S120 of FIG. 3). As shown in FIG. 8, the friendlyNames of the information processing apparatuses 100A and 100C are both "BDZ", and thus, are the same with each other. Accordingly, since one of the friendlyNames of the information processing apparatuses 100A and 100C has to be changed, the information processing apparatuses 100A and 100C respectively perform the next processing of judging. On the other hand, the friendlyName of the information processing apparatus 100B is "BDZ-1" and the friendlyName of the information processing apparatus 100C is "BDZ". Accordingly, since the friendlyNames of the information processing apparatuses 100B and 100C are not the same with each other, the information processing apparatus 100B terminates the processing without changing the friendlyName.

Next, the information processing apparatuses 100A and 100C respectively check whether it is possible to change the self friendlyNames (S313, S314, corresponding to S130 of FIG. 3). As shown in FIG. 8, lock information of the information processing apparatuses 100A is "YES", and lock information of the information processing apparatus 100C is "NO". That is, since the information processing apparatus 100A is already recognized by other device, its friendlyName cannot be changed. Accordingly, the information processing apparatus 100A terminates the processing without changing the self friendlyName. On the other hand, the information processing apparatus 100C can change the self friendlyName. Accordingly, the information processing apparatus 100C further proceeds to the next processing of judging.

Further, the information processing apparatus 100C compares self time stamp and time stamp of the information processing apparatus 100A (S316, corresponding to S140 of FIG. 3). As shown in FIG. 8, since the information processing apparatus 100C is not access by other devices, there are no time stamps, and thus, the time stamp is older than the time stamp "2007.03.23.16:00:30" of the information processing apparatus 100A. Accordingly, the information processing apparatus 100C changes the self friendlyName and terminates the processing (S319, corresponding to S170 of FIG. 3). The friendlyName of the information processing apparatus 100C is changed to "BDZ-2", for example.

As such, even when the device identification name of an information processing apparatus 100 newly connected to the network 105 is the same with the device identification name of the information processing apparatus 100 already connected to the network 105, the name of one of the information processing apparatuses 100 to which the same device identification names are added is automatically changed.

Heretofore, the configuration of the information processing apparatus 100 according to the first embodiment, the method for changing a device identification name and concrete example of the processing thereof have been described. According to the embodiment, when there are device identification names that are the same with each other, each information processing apparatus 100 judges, according to a predetermined rule set beforehand, whether or not to change the device identification name, and, according to the judgment result, can automatically change the device identification name to a different name. Thereby, a user can identify a corresponding device by the device identification name. Further, by changing a device identification name according to a predetermined rule, confusion at the time of changing can be reduced.

Second Embodiment

Figure 10:
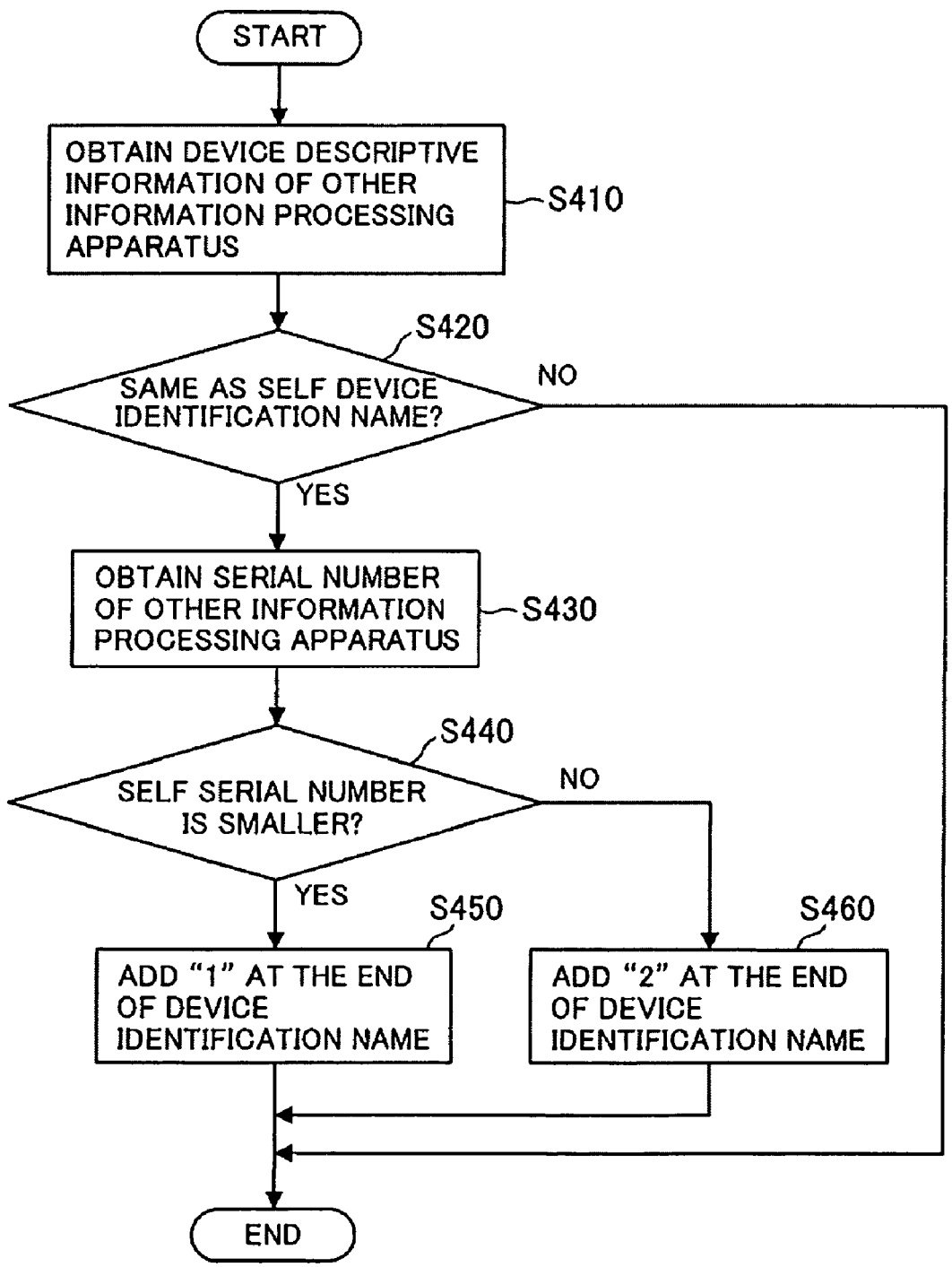
FIG. 10 is a flow chart showing a method for changing a device identification name according to a second embodiment of the present invention.

Next, by referring to FIG. 10, a method for changing a device identification name according to a second embodiment of the present invention will be described. FIG. 10 is a flow chart showing the method for changing a device identification name according to the embodiment. The method for changing a device identification name according to the embodiment differs from the method of the first embodiment, which changes the device identification name of one of the information processing apparatuses 100 having the same device identification name, in that the method changes the device identification names of both of the information processing apparatuses 100 having the same device identification name. In the following, processings which differ from those of the first embodiment will be mainly described, and the detailed description on processings similar to those of the first embodiment will be omitted.

(Method for Changing Device Identification Name)

As shown in FIG. 10, according to the method for changing a device identification name according to the embodiment, first, the information processing apparatus 100 obtains device descriptive information of the other information processing apparatus 100 (S410). Next, the information processing apparatus 100 judges whether the device identification name of the information processing apparatus 100 and the device identification name of the other information processing apparatus 100 are the same or not (S420). When it is judged that the device identification names of both sides are different from each other, the processing is terminated without changing the self device identification name. On the other hand, when it is judged that the device identification names of both sides are the same with each other, the processing proceeds to step S430. Incidentally, the steps S410 and S420 are the same as the steps S110 and S120 of the first embodiment.

When it is judged in step S420 that the device identification names of both sides are the same with each other, the information processing apparatus 100 obtains a serial number of the other information processing apparatus 100 (S430). A serial number is identification information unique to a device, and corresponds uniquely with one information processing apparatus 100. Incidentally, although a serial number is used in the embodiment, the present invention is not limited to such and, an IP address, a device ID and the like may be used as unique identification information.

Next, the information processing apparatus 100 compares the serial number of the information processing apparatus 100 and the serial number of the other information processing apparatus 100 and determines how the self device identification name is to be changed (S440). The processing of step S440 is a processing of automatically determining, in case of changing the device identification names of both of the two information processing apparatuses 100, how the device identification names are to be changed. In the embodiment, a rule is set that "1" is to be added at the end of the device identification name of the information processing apparatus 100 whose serial number is smaller, and "2" is to be added at the end of the device identification name of the other information processing apparatus". Such rule may be changed to "2" is to be added at the end of the device identification name of the information processing apparatus whose serial number is smaller, and "1" is to be added at the end of the device identification name of the other information processing apparatus". Similar rules may be set for unique identification information other than the serial number.

According to the rule set in the embodiment, in case the self serial number is smaller than that of the other, "1" is added at the end of the self device identification name (S450). On the other hand, when the serial number of the other is smaller than the self serial number, "2" is added at the end of the self device identification name (S460). Accordingly, when the device identification names before change is "BDZ", for example, the device identification names after change will be "BDZ-1" and "BDZ-2". Incidentally, also in this case, when there is a rule to the way of adding a character and the like to the device identification name, a storage section for storing information needed for the processing may be separately provided.

Heretofore, the method for changing a device identification name according to the embodiment has been described. According to the embodiment, when a plurality of the information processing apparatuses 100 having the same device identification name are connected via the network 105, by using unique identification information for a device to identify other devices, the device identification names can be automatically changed to names different from the other. Thereby, a user can identify a corresponding device by the device identification name. Further, by changing a device identification name according to a predetermined rule, confusion at the time of changing can be reduced.

It should be understood by those skilled in the art that various modifications, combinations, sub-combinations and alterations may occur depending on design requirements and other factors insofar as they are within the scope of the appended claims or the equivalents thereof.

For example, in the embodiments described above, a device identification name is changed when a plurality of devices are connected to a network or when a device with the same name is newly connected to the same network. However, the present invention is not limited to such. For example, the processing of changing the device identification name may be performed when a user manually changes the device identification name.

Further, in the embodiments described above, a device identification name, lock information, a time stamp and the like used at the time of judging whether or not to change the device identification name are information included in device descriptive information. However, the present invention is not limited to such. For example, information needed for processing of judging may be individually obtained at the time of judging. As in the embodiments described above, when performing processing of judging by using information included in device descriptive information, there is the advantage that, in the processing of judging, it is not necessary to access the other information processing apparatus to obtain information.

What is claimed is:
1. A method of operating a first information processing apparatus to which a device identification name is added for identification by a user, comprising:
an obtaining step of obtaining a device identification name of a second information processing apparatus connected to a same network as the first information processing apparatus;

a comparing step of comparing the device identification name of the second information processing apparatus and the device identification name of the first information processing apparatus;

a judging step of judging, via a judging section of the first information processing apparatus, according to a predetermined rule set beforehand, whether or not to change the device identification name of the first information processing apparatus when the device identification name of the second information processing apparatus and the device identification name of the first information processing apparatus are the same; and a changing step of changing the device identification name of the first information processing apparatus when it is judged to change the device identification name of the first information processing apparatus in the judging step, wherein the judging step comprises a lock judging step of judging, via the judging section, based on lock information indicating whether it is possible to change the device identification name of the first information processing apparatus, whether or not to change the device identification name of the first information processing apparatus, wherein the lock information is based on a determination of whether the second information processing apparatus has recognized the first information processing apparatus, and wherein the judging step further comprises a time stamp judging step of judging whether or not to change the device identification name of the first information processing apparatus based on access history indicating status of access from an information processing apparatus connected to the same network.

2. The method according to claim 1, wherein the time stamp judging step
compares a time stamp of the first information processing apparatus and a time stamp of the second information processing apparatus, and
changes the device identification name of the first information processing apparatus when the time stamp of the first information processing apparatus is older than that of the second information processing apparatus.

3. The method according to claim 1, wherein the judging step comprises:
a unique identification information judging step that judges whether or not to change the device identification name of the first information processing apparatus based on a comparison between identification information unique to the first information processing apparatus and identification information unique to the second information processing apparatus.

4. A first information processing apparatus to which a device identification name is added for identification by a user, comprising:
an obtaining section for obtaining a device identification name of a second information processing apparatus connected to the same network as the first information processing apparatus;
a comparing section for comparing the device identification name of the second information processing apparatus and the device identification name of the first information processing apparatus;
a judging section for judging, according to a predetermined rule set beforehand, whether or not to change the device identification name of the first information processing apparatus when the device identification name of the second information processing apparatus and the device identification name of the first information processing apparatus are the same; and
a changing section for changing the device identification name of the first information processing apparatus when it is judged to change the device identification name of the first information processing apparatus,
wherein the judging section comprises a lock judging section for judging, based on lock information indicating whether it is possible to change the device identification name of the first information processing apparatus, whether or not to change the device identification name of the first information processing apparatus, wherein the lock information is based on a determination of whether the second information processing apparatus has recognized the first information processing apparatus, and wherein the judging step further comprises a time stamp judging step of judging whether or not to change the device identification name of the first information processing apparatus based on access history indicating status of access from an information processing apparatus connected to the same network.

5. A network system in which a plurality of information processing apparatuses to which device identification names are added for identification by a user are connected with each other via the network, wherein
a first information processing apparatus is configured to:
obtain a device identification name of a second information processing apparatus connected to the same network,
compare the device identification name of the second information processing apparatus and the device identification name of the first information processing apparatus,
judge, according to a predetermined rule set beforehand, whether or not to change the device identification name of the first information processing apparatus when the device identification name of the second information processing apparatus and the device identification name of the first information processing apparatus are the same; and
change the device identification name of the first information processing apparatus when it is judged to change the device identification name of the first information processing apparatus,
wherein the judging comprises judging, based on lock information indicating whether it is possible to change the device identification name of the first information processing apparatus, whether or not to change the device identification name of the first information processing apparatus, wherein the lock information is based on a determination of whether the second information processing apparatus has recognized the first information processing apparatus, and wherein the judging step further comprises a time stamp judging step of judging whether or not to change the device identification name of the first information processing apparatus based on access history indicating status of access from an information processing apparatus connected to the same network.

* * * * *